Figure 8:
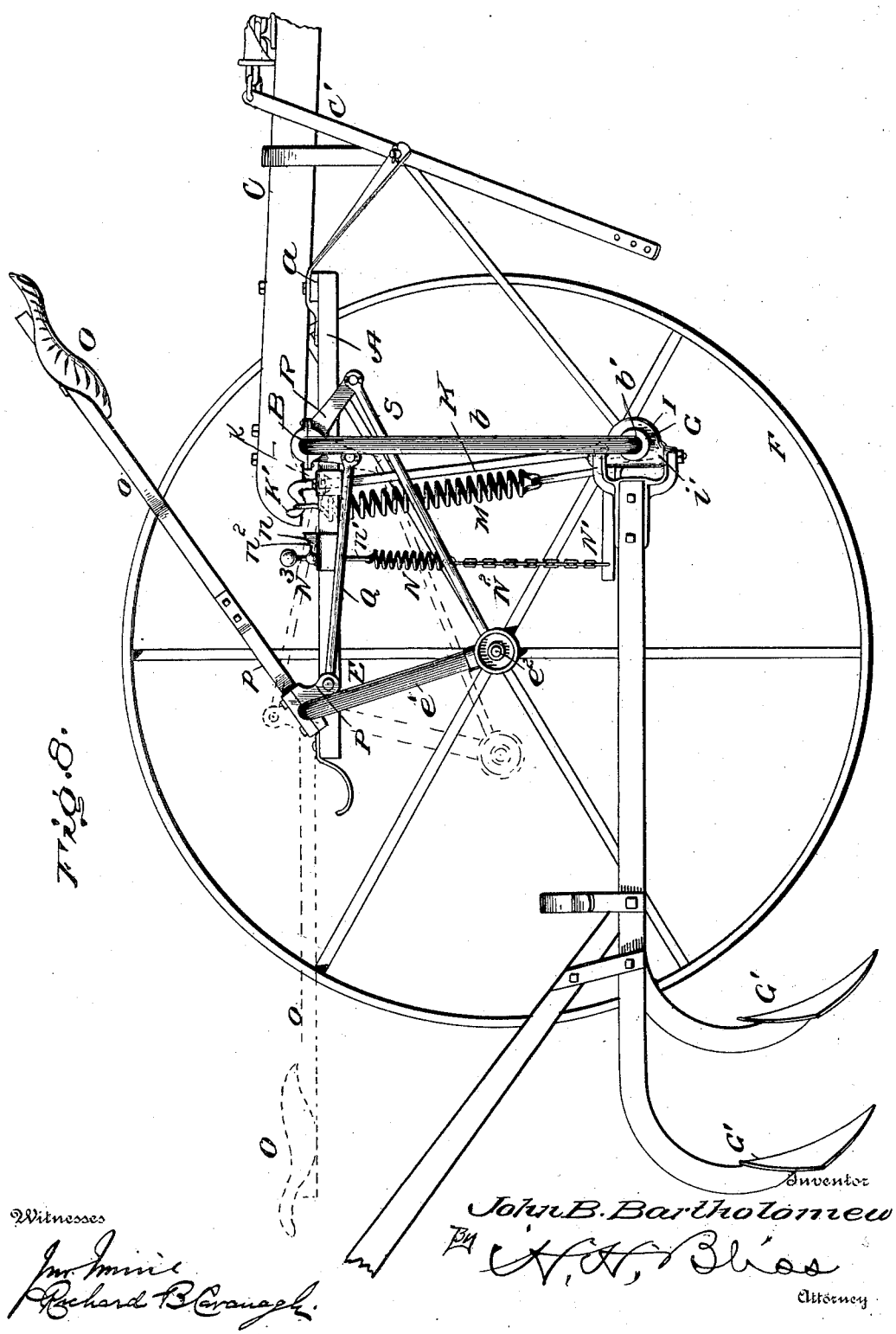

No. 701,007. Patented May 27, 1902.
J. B. BARTHOLOMEW.
CULTIVATOR.
(Application filed Jan. 29, 1900.)
(No Model.) 6 Sheets—Sheet 1.
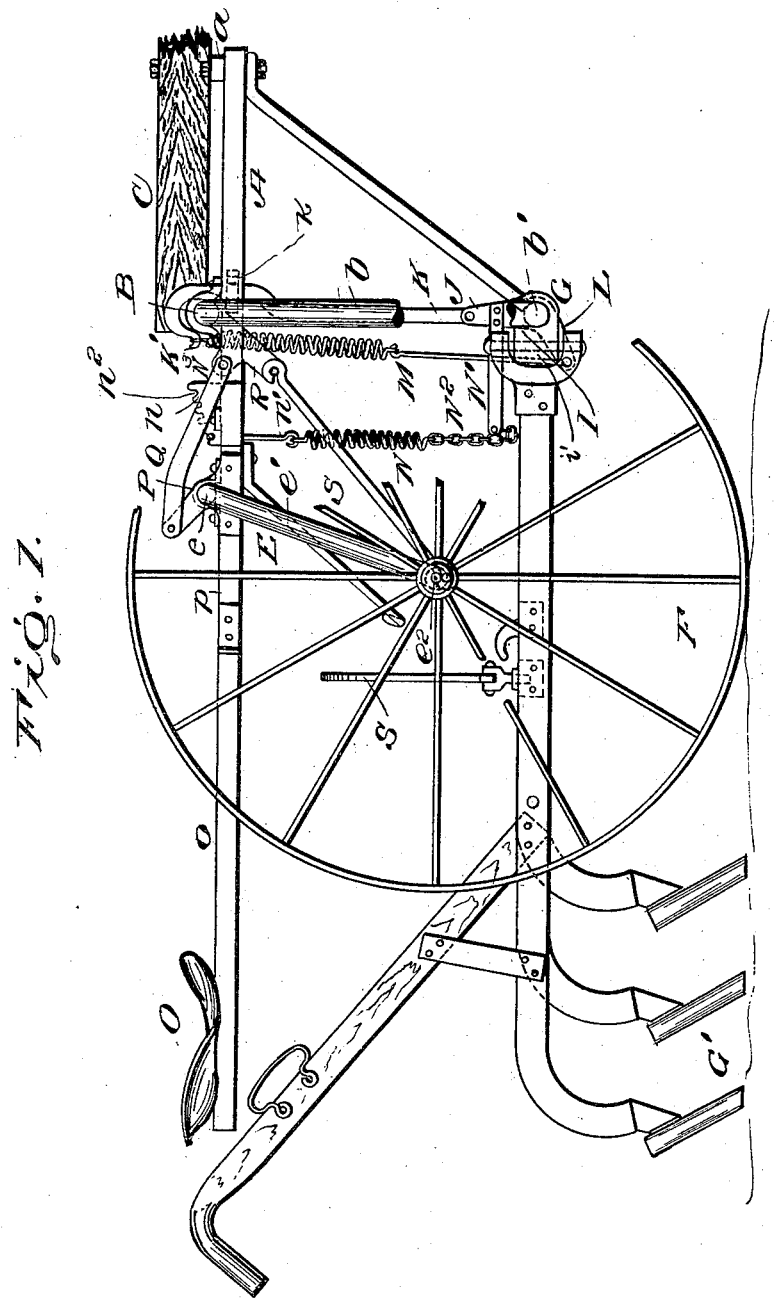
Witnesses
Inventor
John B. Bartholomew
By his Attorney

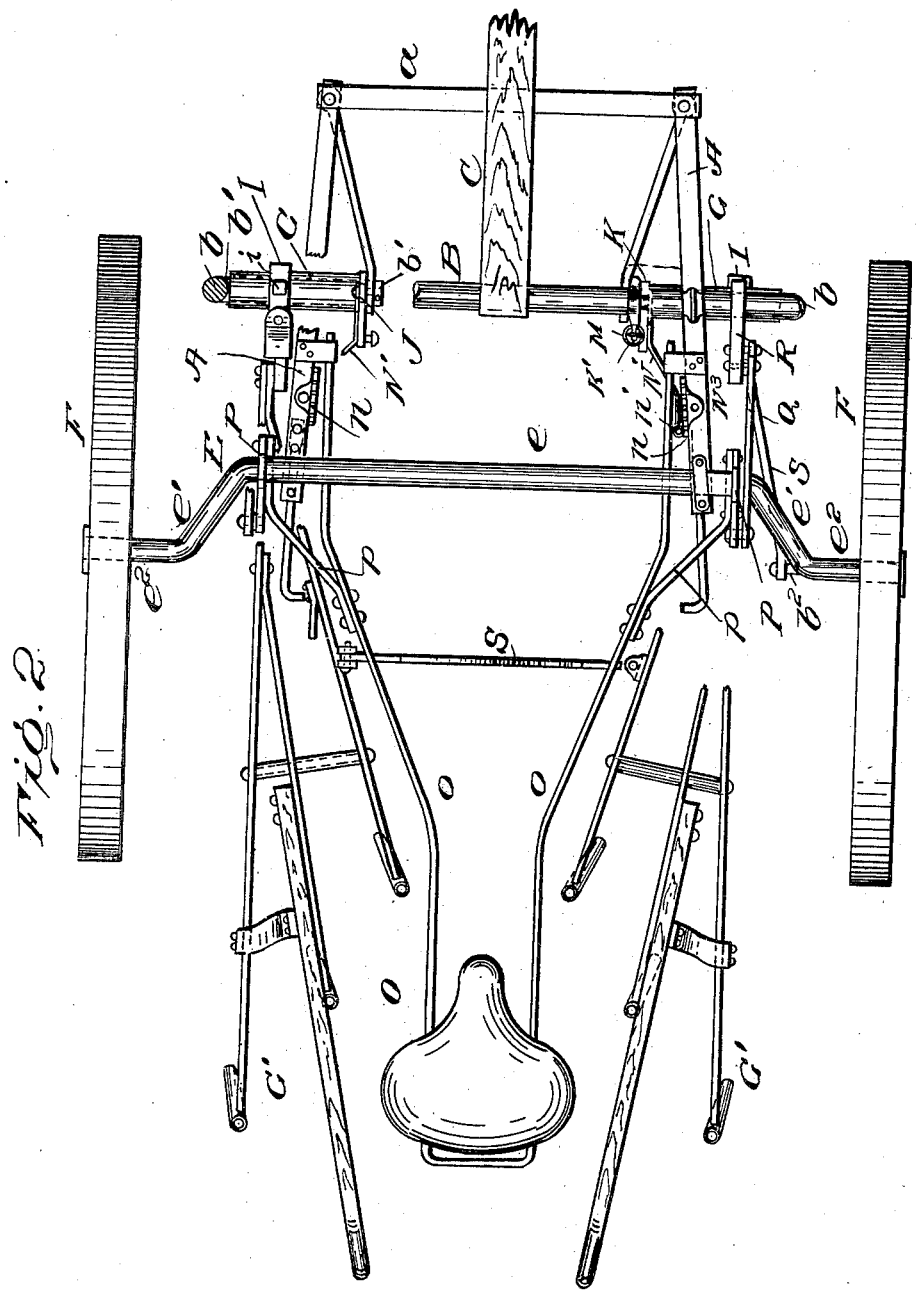

No. 701,007. Patented May 27, 1902.
J. B. BARTHOLOMEW.
CULTIVATOR.
(Application filed Jan. 29, 1900.)
(No Model.) 6 Sheets—Sheet 3.
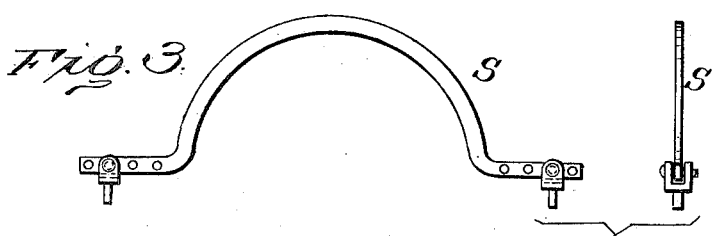
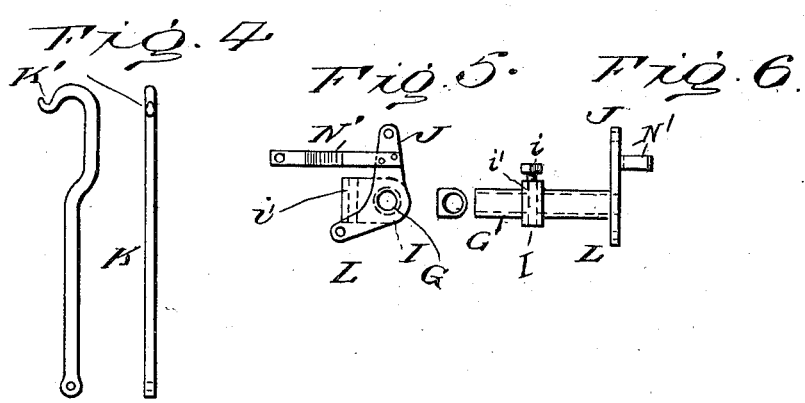
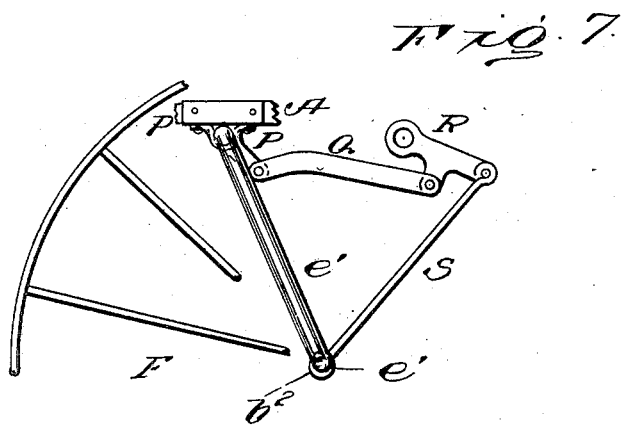
WITNESSES:
INVENTOR
John B. Bartholomew
BY
W. H. Bliss
ATTORNEY.

No. 701,007. Patented May 27, 1902.
J. B. BARTHOLOMEW.
CULTIVATOR.
(Application filed Jan. 29, 1900.)
(No Model.) 6 Sheets—Sheet 4.

Witnesses
Inventor
John B. Bartholomew
By H. H. Bliss
Attorney

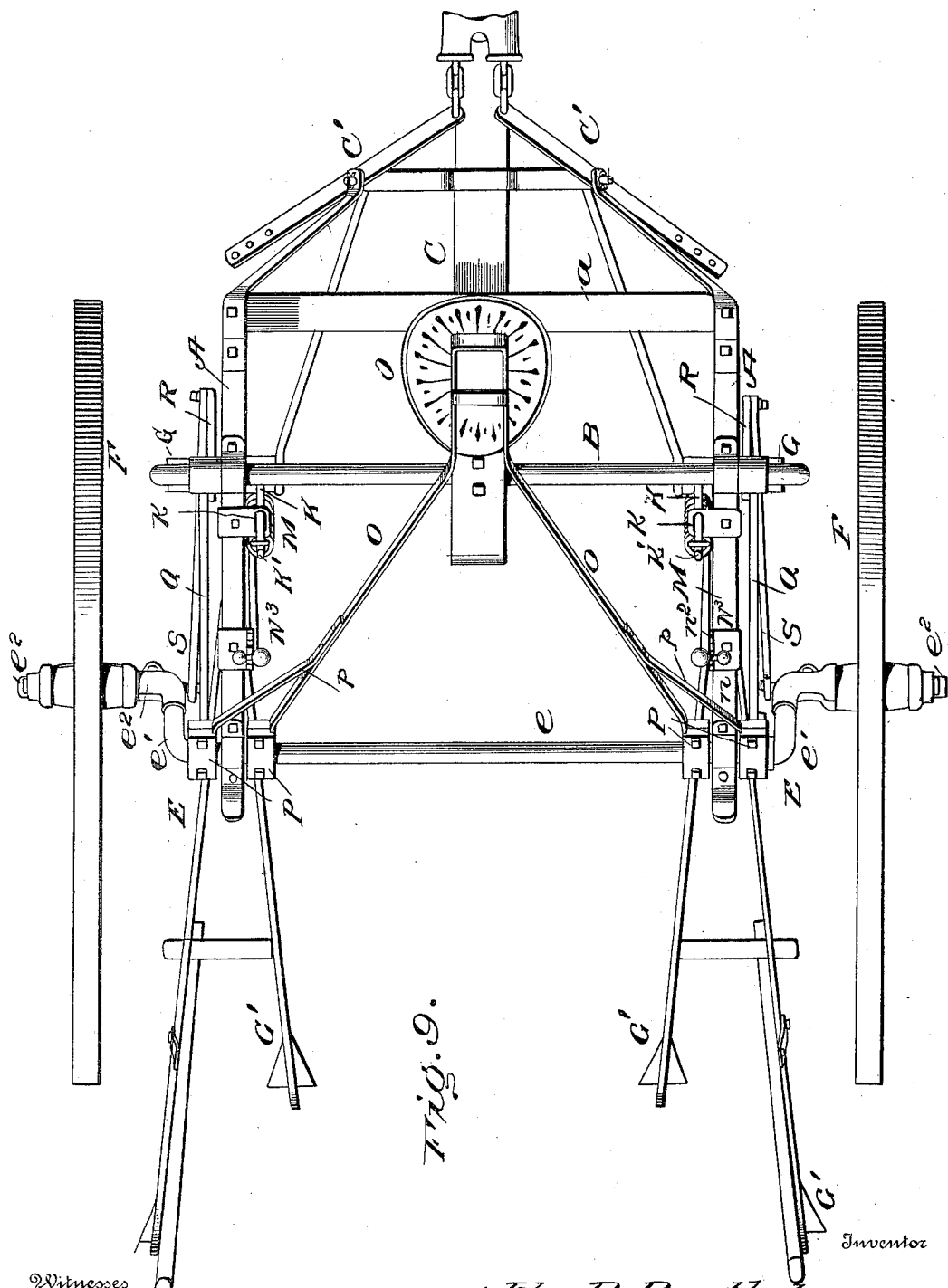

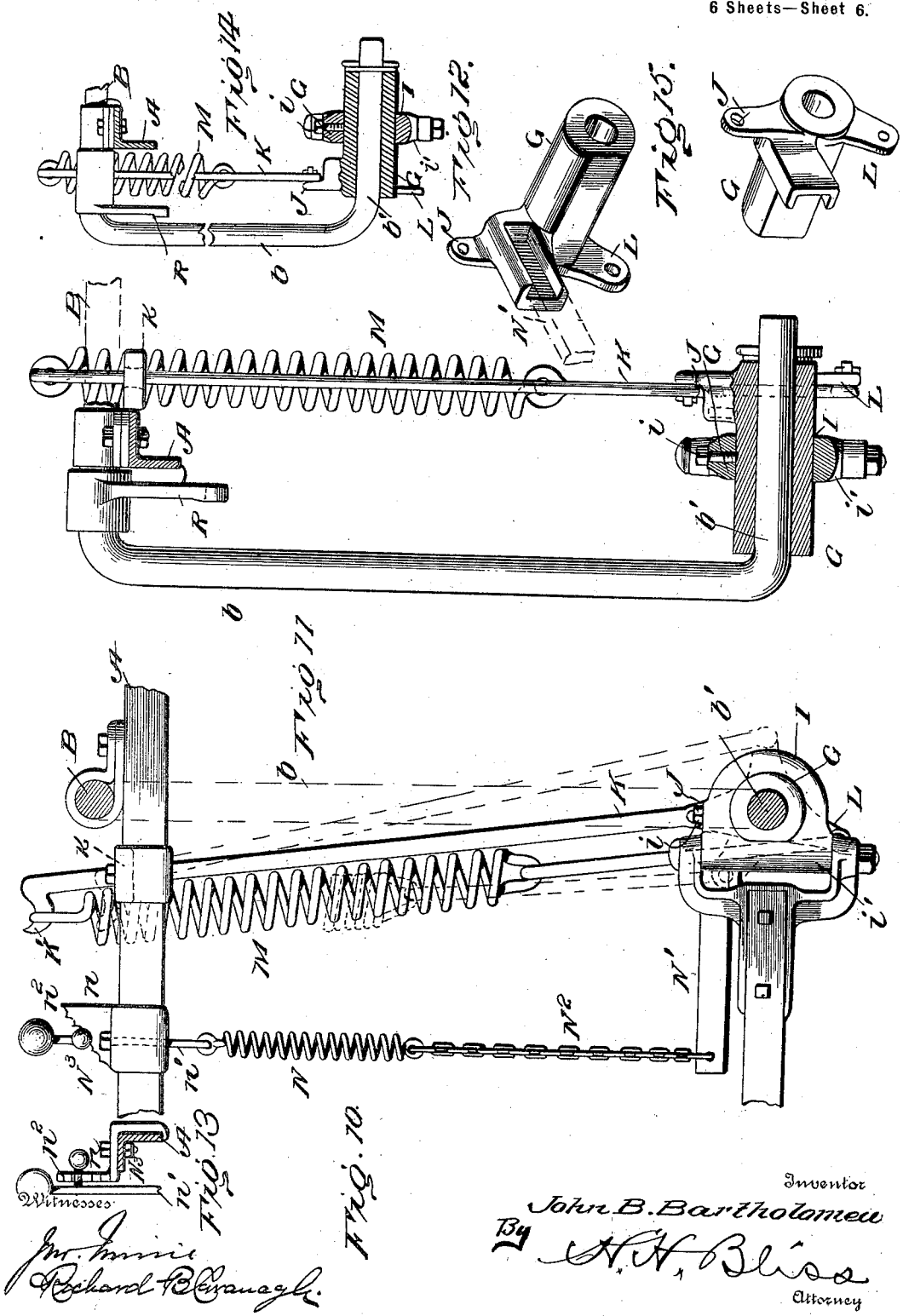

UNITED STATES PATENT OFFICE.

JOHN B. BARTHOLOMEW, OF PEORIA, ILLINOIS, ASSIGNOR TO AVERY MANUFACTURING COMPANY, OF PEORIA, ILLINOIS.

CULTIVATOR.

SPECIFICATION forming part of Letters Patent No. 701,007, dated May 27, 1902.

Application filed January 29, 1900. Serial No. 3,186. (No model.)

*To all whom it may concern:*

Be it known that I, JOHN B. BARTHOLOMEW, a citizen of the United States, residing at Peoria, in the county of Peoria and State of Illinois, have invented new and useful Improvements in Cultivators, of which the following is a specification.

Figure 1 is a side elevation of a mechanism embodying my improvements. Fig. 2 is a top view. Figs. 3 to 7 show details. Fig. 8 is a modified form of cultivator. Fig. 9 is a plan view of that in Fig. 8. Figs. 10 to 15, inclusive, show the details of the forms in Figs. 8 and 9.

In the drawings the machine represented is shown as having a main frame, a wheel-frame, and draft devices, together with the plow-frames and the parts for connecting and supporting them. The main frame can be of any suitable character. It is shown as comprising the side bars A A, together with the cross-bar $a$ and a cross-bar B. The draft devices also may be of one form or another, though I prefer to use substantially such as are shown, they consisting of a tongue C and means for hitching the horses thereto, as at C'. The tongue, as shown, is rigidly secured to the cross-bars $a$ and B. The wheel-frame comprises the parts $e\ e'\ e^2$, these being preferably formed of a single piece of metal bent to the form of what is generally termed a "crank-axle," (indicated as a whole by E.) The wheels F F are mounted upon the spindle parts $e^2$ of this axle. The central part $e$ is arranged transversely of the machine and is pivotally connected to the main frame. The arms $e'$ extend downward from the rocking or pivoted part $e$ to the spindles $e^2$.

G' G' indicate the plows. Inasmuch as these can be of any numerous forms, it is unnecessary to describe all of the parts of either in detail. As shown, each gang or each set of shovels is provided with and carried by a beam or main bar, which at its front end is loosely connected to the main frame. The connecting devices which I employ are constructed and arranged as follows: The above-mentioned cross-bar B is extended downward at the sides of the machine, as shown at $b\ b$, and the end parts are turned inward to form the spindles $b'\ b'$. Upon each of these spindles there is placed a pipe-box G, adapted to rock thereon. Upon the outside of each of the pipe-boxes there is placed a laterally-adjustable eyepiece I, which can be set in any desired position by means of a screw at $i$. As the pipe-box and the eyepiece are non-circular in section, the eye is prevented from rotating on the box and the eye is cast with a tubular bearing $i'$, which receives the vertical pivot-bolt of one of the plows or shovel-gangs.

Each beam or plow-gang is provided with a spring holding and lifting mechanism constructed and arranged as follows:

J is an arm projecting from and preferably cast with the pipe-box G. To this arm is pivoted the bar K, which extends upward through and is loosely held by a guide $k$, carried by the main frame. The pipe-box also has rigid with it an arm L. M is a spring which at one end is connected to this arm L and at its other end is connected to the upper end of the bar K, which latter has a hook K' to receive it.

The parts of the spring mechanisms above described are more or less similar to those which have been known since the date of the patent, No. 351,684, to Avery and Berrien, dated October 26, 1886; but I have found that under some circumstances this spring mechanism can be used more advantageously if employment be made of supplemental devices, such as those shown at N N' N² N³. N is a spring; N', a crank-bar or lever-arm secured to the pipe-box. N² is a connecting device between the spring and the lever, preferably a chain, and N³ is an adjustable connecting or supporting device for the upper end of the spring. This connecting device, as shown, consists of the parts $n$ and $n'$. $n$ is a plate fastened to the machine and formed with a series of notches varying vertically in their positions, and $n'$ is a hook-rod connected to the spring N and adapted to be seated in either one of the notches $n^2$ in the plate $n$. The bar or lever N' extends backward from the pipe-box far enough to give the desired leverage. It, together with the spring N and the supporting devices $n$ and $n'$, serves to hold the gang or plow-beam in whatever position the operator selects and insures a perfect regulation of the depth of the working. The operator can at any time readily adjust the parts in this respect by placing the hook-rod $n'$ in a higher or lower notch, as occasion requires.

As concerns the parts just described, it will be seen that the pipe-box constitutes a vertically-rocking hinge element for the beam, while the clevis or fork at the front end of the beam serves as a horizontally-rocking hinge element. It will also be noted that both of the spring holding devices are connected to the beam in such way as to be inactive in relation to the latter as concerns its lateral or horizontal movement, one being active vertically at times when the other is approximately inactive.

One of the objects of the present invention is to provide a machine which can be readily converted from a walking-cultivator to a riding-cultivator, and vice versa. To accomplish this, the wheel-frame is connected to other parts, which adjust and hold it as follows:

O is the seat. It is supported upon a frame having the bars $o, o$, which are pivotally connected to the main frame, as by hinging them to the part $e$ of the crank-axle. The seat and its carrier can be turned either into the riding position, as shown in Fig. 1, or can be turned forward, so the seat is in the position shown in Figs. 8 and 9.

P P are cranks connected with the seat-frame. They can be so connected in the way shown—that is, by extending bars $p$ outward from the seat-bars and rigidly joining the cranks P thereto, these cranks rocking around the axis of the crank-axle. These cranks are connected by links Q with cranks R. The latter are mounted on the cross-bar B or otherwise mounted on the frame. The links Q may be shaped as required. For instance, they may be straight, as in Fig. 8 and others, or bent, as in Fig. 1, according to the relative positions of adjacent parts. S represents links connecting these cranks R with the spindles $b^2$ of the wheels. When the seat is turned to its rear position, the seat-frame causes the cranks P to draw backward on the links Q, and these cause the rocking of the cranks R, which in turn push backward upon the links S and the wheel-spindles, causing the crank-axle to rock on the axis of the part at $e$ sufficiently to carry the wheel-spindles to a line in rear of the vertical plane of the said axis. When the wheels are in this rear position, a certain amount of the weight of the machine is thrown to the front of the wheel-spindles, and this serves to counterbalance the weight of the operator. When, on the other hand, the seat is swung to the forward position, the movements of the parts above named are reversed, and the wheels are placed in front of the axis of the part $e$, and as the operator is now walking the rear part of the machine is used to balance the forward part.

The seat-support bars O are bent from flat metal and arranged to extend to points in front of the axis of the hinge of said support and to bear against the main frame or against abutments, as shown, situated at points in front of said axis, and the bars $p$ are also formed of flat metal separately from the bars O and extended outwardly therefrom, these furnishing the hinging means for the seat-support and also the power-transmitter, by which the seat-support can be utilized to regulate the position of the ground-wheels.

In Figs. 8 to 15 there is shown a cultivator substantially similar to that above described in detail. In this case the spring M and the thrust-rod K are both in rear of the cross-bar B, while in the construction in Figs. 1 and 2 the thrust-bar K extends upward on the front side of the cross-bar, the hook K' being carried over the latter to engage with the spring M. Similarly there are minor differences as concerns the details relative to the parts which connect the seat-support O with the axle-bar $e$. In this case the pipe-box G has a socket cast thereon to receive the bar N'. In the machine shown in Figs. 1 and 2 the main bars of the seat-support O extend under the axle-bar $e$ and have their front ends arranged to impinge upon stops on the main frame when the seat is in its lower position, whereas in the machine shown in Figs. 8 and 9 the seat is pivoted to the axle-bar by means of cast boxes or bearings, and they are stopped from descending too low by having the arms $p$ arranged to strike the rearwardly-projecting parts of the side bars A of the frame. In either machine both the springs M and N are so arranged and so connected to the plow-beam that there will be no interference from either with the free lateral movements of the beam. The spring N will be practically inactive, except when the beam is in about its working position, and the spring M will be inactive, or practically so, except when the beam is rising or descending.

What I claim is—

1. The combination of the frame, the draft devices, the supporting-wheels, adjustable relatively to the draft devices and frame, the plow-beam, the double-acting spring connected with the plow-beam, and the supplemental spring arranged to hold the plow-beam in its normal working position substantially as set forth.

2. The combination of the main frame, the draft devices, the supporting-wheels, the plow-frame, the double-acting spring arranged to lift the plow-frame irrespective of the lateral movements of the latter, and the supplemental spring adapted to lift the plow independently of its lateral movements.

3. The combination of the main frame, the draft devices, the plow-beam, the vertically-rocking hinge element for the plow-beam, the horizontal, rocking hinge element for the plow-beam, the lifting-spring arranged to be approximately inactive when the beam is in working position, and the supplemental control-spring at the rear of said vertically-rocking hinge element, both of said springs bearing on the plow-beam without direct connection therewith, substantially as set forth.

4. The combination of the main frame, the draft devices, the plow-beam, the vertically-rocking hinge element for the plow-beam, the horizontally-rocking hinge element for the plow-beam, the lifting-spring arranged to be approximately inactive when the beam is in working position, and having means whereby each end of the spring acts to lift the beam and the supplemental control-spring, both of said springs being connected to the vertically-rocking hinge element for the plow-beam, substantially as set forth.

5. The combination of the main frame, the draft devices, the plow-beam, the vertically-rocking hinge element for the plow-beam, the horizontally-rocking hinge element for the plow-beam, the lifting-spring connected to the vertically-rocking hinge element, a lever-like device connected to the said vertically-rocking hinge element, and a supplemental control pulling-spring connected to said lever-like device, substantially as set forth.

6. The combination of the main frame, the vertically-swinging laterally-movable plow-beam, and two spring holding devices for the beam at all times inactive relative to the lateral movement of the beam, but adapted to modify the vertical movements thereof, one adapted to exert its force, when the beam is in its working position, on a line approximately radial to the horizontal axis of the beam, and the other to exert its force at said times on a line remote from the radial and at the rear of said axis, substantially as set forth.

7. The combination of the main frame, the plow-beam hinged to the main frame, the spring lifting device for the beam at all times inactive relative to the lateral movements of the beam, and the supplemental control-spring, at all times inactive relative to the lateral movements of the beam, and having its end adjustably connected to the main frame independently of said lifting-spring, substantially as set forth.

8. The combination of the main frame, the plow-beam connected with said frame to swing vertically and laterally by horizontal and vertical hinges, and a beam-controlling spring at the rear of said hinges and held against lateral movement with the beam, said spring being inactive when the beam is elevated and active in the working position of the beam, to sustain the beam vertically independent of its lateral movement.

9. The combination of the frame, the plow-beam the wheels adjustable relatively to the plow-beam, the crank-lever R, a lever-like bar O, a link connecting said parts and the link S connecting the crank-lever R to the wheels, substantially as set forth.

10. The combination of the main frame, the plow-beam, the wheels adjustable relatively to the plow-beam, the link S, the crank-lever R, the link Q, a lever-like device as at O pivoted to the main frame, and having a crank P pivoted to the link Q, substantially as set forth.

11. In a cultivator, the combination, with the plow-beam and the main frame, of a tubular hinge element for the beam as at G having a crank or arm L for a lifting-spring, a crank or arm J for imparting power from a lifting-spring to the hinge element, and a crank arm or lever N' for receiving a supplemental spring, substantially as set forth.

12. The combination of the main frame, the wheels adjustable longitudinally of the frame, the driver's seat, and the seat-support connected to the wheels for adjusting them, and having forward-extending arms adapted to bear against the main frame or against abutments thereon when the seat is in its lowest position, substantially as set forth.

13. The combination of the main frame the wheels adjustable longitudinally thereof, the seat and the seat-support hinged to the main frame and connected to said wheels for adjusting them, said seat-support being formed of the flat bars O, O, the laterally-turned bars p rigidly secured to the bars O and hinged to the main frame, said bars O extending forward of the hinge-axis and adapted to bear against the main frame or abutments thereon in front of said axis, substantially as set forth.

14. The combination of the main frame, the plow-beam connected with said frame to swing vertically and laterally by horizontal and vertical hinges, a beam-controlling spring at the rear of said hinges and held against lateral movement with the beam, said spring being inactive when the beam is elevated and active in the working position of the beam to sustain the beam vertically independent of its lateral movement, and means for adjusting the suspension-point of said spring vertically.

15. The combination of the main frame, the plow-beam connected with said frame to swing vertically and laterally by horizontal and vertical hinges, a beam-controlling spring at the rear of said hinges and held against lateral movement with the beam, said spring being inactive when the beam is elevated and active in the working position of the beam to sustain the beam vertically independent of its lateral movement, and the notched plate n and rod n' for holding said spring at different heights.

In testimony whereof I have signed my name to this specification in the presence of two subscribing witnesses.

JOHN B. BARTHOLOMEW.

Witnesses:
G. F. CARSON,
J. M. ORTON.